G. WESTINGHOUSE.
TURBINE.
APPLICATION FILED APR. 18, 1910.

972,421.

Patented Oct. 11, 1910.

WITNESSES:

INVENTOR.
Geo. Westinghouse
BY
HIS ATTORNEY IN FACT.

UNITED STATES PATENT OFFICE.

GEORGE WESTINGHOUSE, OF PITTSBURG, PENNSYLVANIA.

TURBINE.

972,421.  Specification of Letters Patent.  Patented Oct. 11, 1910.

Application filed April 18, 1910. Serial No. 556,151.

*To all whom it may concern:*

Be it known that I, GEORGE WESTINGHOUSE, a citizen of the United States, and a resident of Pittsburg, in the county of Allegheny and State of Pennsylvania, have made a new and useful Invention in Turbines, of which the following is a specification.

This invention relates to turbines and particularly to the type of turbine disclosed in my United States application No. 547,984, filed March 8th, 1910. In the said application, Serial No. 547,984, the nozzle blocks and the bush or bushes for the ahead and the astern admission valves are so arranged that each bush is pressed into the casing of the turbine so when it is necessary or desirable to remove the nozzle blocks for any purpose the bush or bushes must be drawn out through the opening or openings in the casing of the turbine before the nozzle blocks can be removed. I have found that under certain conditions it is necessary to remove the nozzle blocks and I have provided means whereby the nozzle blocks and the bushes for the ahead and astern inlet valves may be withdrawn from the turbine casing together without disturbing the relative positions of any of the parts. To this end I have provided means whereby the ahead and astern bushes are carried by the nozzle blocks or by a strip which may be a centering strip to properly position the bushes with the inlet ports in the casing with which they are associated.

Figure 1:
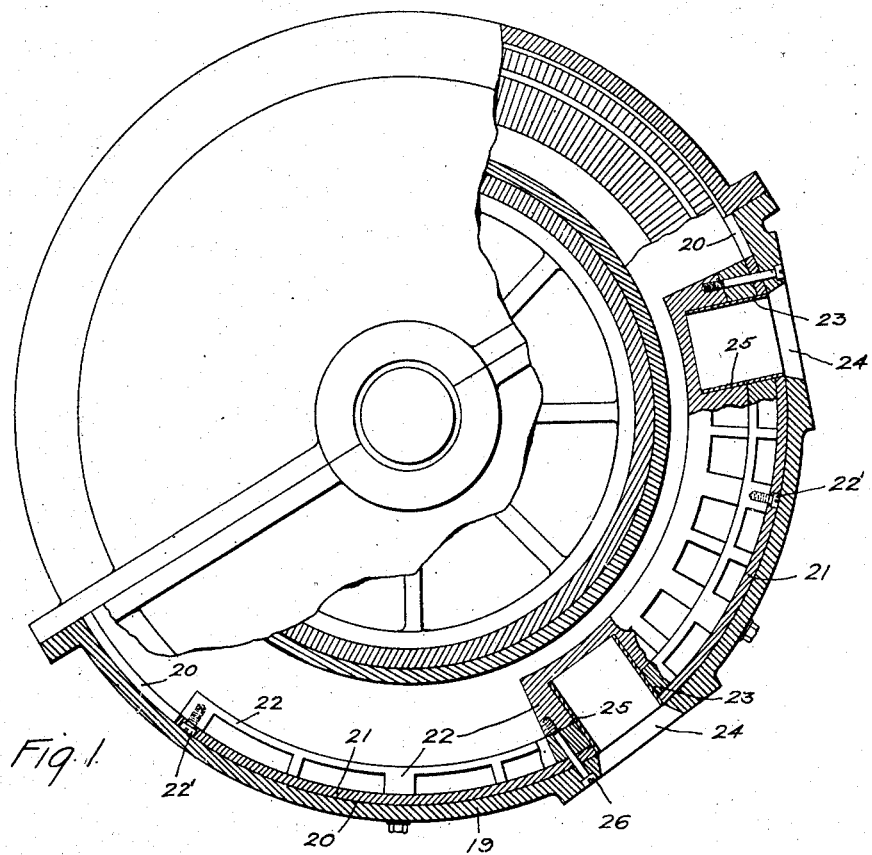
Figure 2:
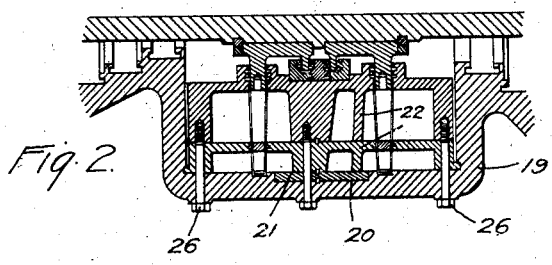

In the drawings, Figure 1 is a view partly in elevation and partly in section showing the nozzle blocks and the valve bushes in place, and Fig. 2 is a cross sectional view through a portion of the turbine and through one of the nozzle blocks.

In carrying out my invention I provide the stator or casing 19 with an arcuate groove 20 which may extend approximately around one-half the turbine casing or at least a sufficient distance to accommodate the segmental strip 21 which carries the nozzle blocks 22. The groove 20 may be of sufficient width to receive a relatively wide strip 21 to which the nozzle blocks may be secured by suitable fastening devices, as for example, the screws 22'. The strips 21 are provided with suitable openings 23 which are adapted to aline with the inlet openings 24 in the turbine stator. Within the openings 23 are pressed or otherwise secured valve bushes 25 of which there may be a suitable number; for example, the marine turbine, one for an ahead section and one for an astern section. The bushes 25 terminate at the inner face of the turbine or at the outer face of the strip 21; in other words, the bushes 25 do not extend within the openings 24. The strip 21 may be secured to the turbine by means of screws 26, of which there may be a suitable number, about the openings 24 or at suitable points along the turbine casing. By providing the strip 21 the bush 25 may be made sufficiently long to afford the necessary lap when the valves are in place. Furthermore the groove 20 may be so machined in the casing that when the strip 21 is slid thereinto it will serve as a centering strip, that is, insure the bushes being caused to aline with the openings 24 preparatory to inserting the valves. It will be obvious that if it is desirable to remove the blocks 22 for any purpose, the screws 26 may be removed and the blocks and bushes removed all together after the valves have been removed from the bushes. This affords a simple and convenient construction for assembling or removal of the blocks or bushes for inspection or repairs.

Having thus described my invention, what I claim is:

1. In a turbine, a nozzle block, a valve bushing, and a strip removably secured to the turbine and carrying the nozzle block and bushing.

2. In a turbine, a stator having a groove, a strip removably secured in said groove, and a nozzle block and valve bushing carried by said strip.

3. In a turbine, a stator having a guide, a strip in said guide, a valve bushing carried by said strip and in line with an inlet opening in the stator, and means for removably securing said strip in said guide.

4. In a turbine, a strip removably secured to the turbine stator, and a valve bushing carried by said strip.

5. In a turbine, a stator having an inlet port, a strip slidably secured to said stator, and a valve bushing carried by said strip and adapted to aline with the inlet opening in the stator.

6. In a turbine, a nozzle block, a valve bushing and segmental strip secured together, and means for removably securing these to the turbine.

In testimony whereof, I have hereunto subscribed my name this 13th day of April, 1910.

GEO. WESTINGHOUSE.

Witnesses:
C. W. McGHEE,
B. M. FERO.